W. C. LOGAN.
TIRE PROTECTOR.
APPLICATION FILED APR. 21, 1916.
1,211,192. Patented Jan. 2, 1917.
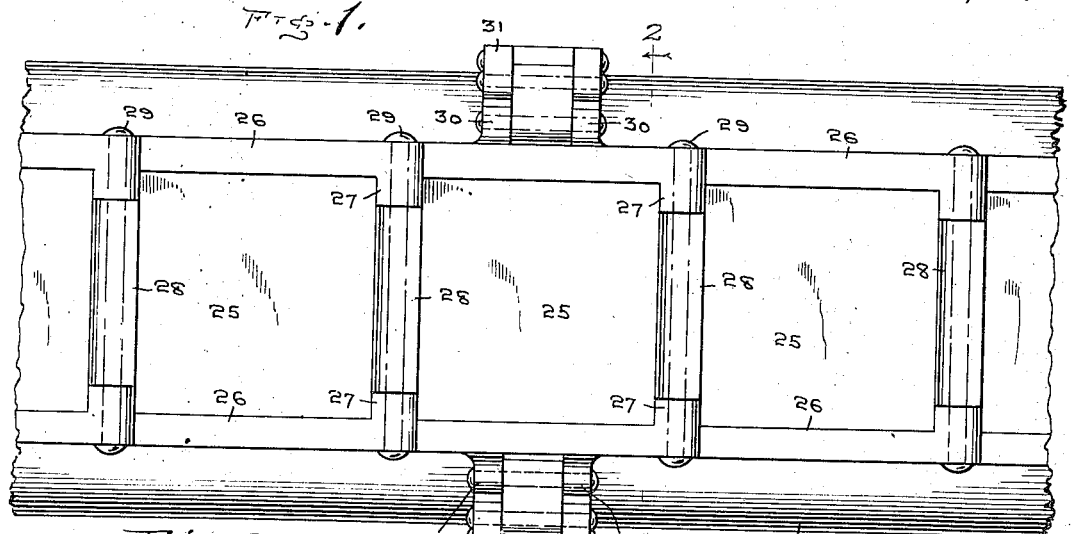
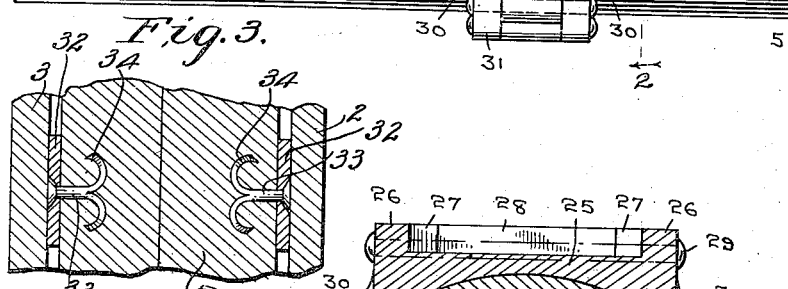
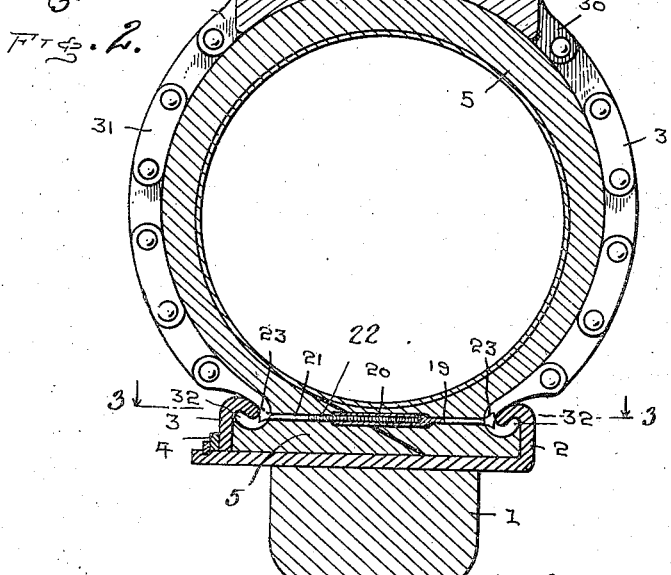
Witnesses
Inventor
W. C. Logan
By W. J. Fitzgerald
Attorney

UNITED STATES PATENT OFFICE.

WILLIAM C. LOGAN, OF LOUDSVILLE, GEORGIA.

TIRE-PROTECTOR.

1,211,192.  Specification of Letters Patent.  Patented Jan. 2, 1917.

Application filed April 21, 1916.  Serial No. 92,741.

*To all whom it may concern:*

Be it known that I, WILLIAM C. LOGAN, a citizen of the United States, residing at Loudsville, in the county of White and State of Georgia, have invented certain new and useful Improvements in Tire-Protectors; and I do hereby declare the following to be a full, clear, and exact description of the invention, such as will enable others skilled in the art to which it appertains to make and use the same.

My invention relates to tire protectors and more particularly to means for securing the protectors upon pneumatic tires of automobiles.

Another object of the invention is the provision of a pair of telescopic bolt members adapted to be passed through the lower ends of the flexible members attached to the tire protectors, and through the base portions of the tire in order to securely and effectively hold the tire protectors in position upon the tire against the liability of slipping or becoming disengaged from the tire.

These and other objects will more fully appear as the nature of the invention is more clearly understood from the following specification, the subject matter of the claims, and the views illustrated in the accompanying drawings, in which, Figure 1 is a fragmentary top view of a tire, showing a protector thereon. Fig. 2 is a vertical transverse sectional view on line 2—2 of Fig. 1, showing the detail construction and the means of mounting and securing the protector upon the tire. Fig. 3 is a horizontal section taken on the line 3—3 of Fig. 2 showing a modified form of the securing means.

The protector shown in Figs. 1 and 2 consists of a plurality of tread plates 25 formed with the upstanding side members 26, the spaced hinge members 27 at one end, and the centrally disposed hinge member 28 at the opposite end adapted to be interposed between the hinge members 27 of the next successive tread plate, the hinge members 27 and 28 of the plates 25 being held in hinged relation with each other through the medium of the hinge bolts 29 suitably secured therein. These plates are arranged in one continuous chain around the periphery of the tire 5 and cover the transverse central portion of the tire.

Suitably formed upon the sides of any desired member of the tread plates 25 are the spaced ears 30, to which ears 30 are connected the link chains 31. The under sides of the tread plates 25 are curved to conform to the curvatures of the exterior of the tire 5, and the chains 31 depending therefrom extend downwardly transversely of the tire 5 in a curved direction engaging the sides of the tire 5. Pivotally mounted in the inner ends of the chains 31 are the hook members 32 adapted to be passed under and to engage the under surfaces of the inwardly directed flanges of the rim of the wheel for retaining the protector upon the tire.

For holding the protector upon the tire when placing the tire upon the wheel and for preventing the protector from jumping off of the tire while the wheel is revolving, I preferably employ a number of telescopic securing bolts. One of these securing bolts is shown in Fig. 2 and comprises the member 19 provided with the screw threaded socket 20 upon one end, and the member 21 provided with the external screw threaded end 22 for engaging the threaded socket 20 of the member 19. The members 19 and 21 are each provided with a head 23 adapted to be seated in a countersunk opening formed in each of the hook members 32 of the link chains 31. The heads 23 of the screw bolt are provided with a kerf or niche for the reception of a screw driver for turning the members 19 and 21 so as to cause the screw bolt, which projects through the hook members and the base of the tire 5, to draw these parts into assembled relation to each other.

In Fig. 3 of the drawings will be seen a slightly modified form of means for securing the lower ends of the hook members 32 to the tire base. In this form, I employ split rivets 33 which are driven through the lower apertured ends of the hook members 32 into the base flanges of the tire 5, and in being driven into the tire, the ends 34 of the rivets 33 are spread, preferably horizontally, so as to be securely and effectively anchored in the tire base. By using split rivets of the above stated character, it will be apparent that a fastening means is produced which will be less expensive than the telescopic screw bolts, but which will secure the lower ends of the hook members in position upon the tire in substantially as effective a manner as the screw bolts.

From the foregoing, it will be seen that the protectors will be positively held in engagement with the tires so as not to slip or become accidentally disengaged therefrom.

Having described my invention, what I claim as new and desire to secure by Letters Patent, is:—

1. The combination with a tire protector comprising a plurality of tread plates hingedly connected together, and means carried by said tread plates for engaging the inturned flanges of a wheel rim for securing the protector upon the tire, of means projecting through the engaging means and the base of the tire for additionally securing the protector upon the tire.

2. The combination with a tire protector comprising a plurality of tread plates hingedly connected together, and flexible means carried by said tread plates for engaging the inturned flanges of a wheel rim for securing the protector upon the tire, of telescopic screw bolts projecting through the engaging means of said tread plates and the base of the tire for additionally securing the protector upon the tire.

In testimony whereof I have signed my name to this specification in the presence of two subscribing witnesses.

WILLIAM C. LOGAN.

Witnesses:
F. LOGAN,
M. V. LEDFORD.